March 10, 1936.    E. G. DE CORIOLIS ET AL    2,033,331
HEAT TREATING FURNACE
Original Filed Sept. 28, 1933    3 Sheets-Sheet 3
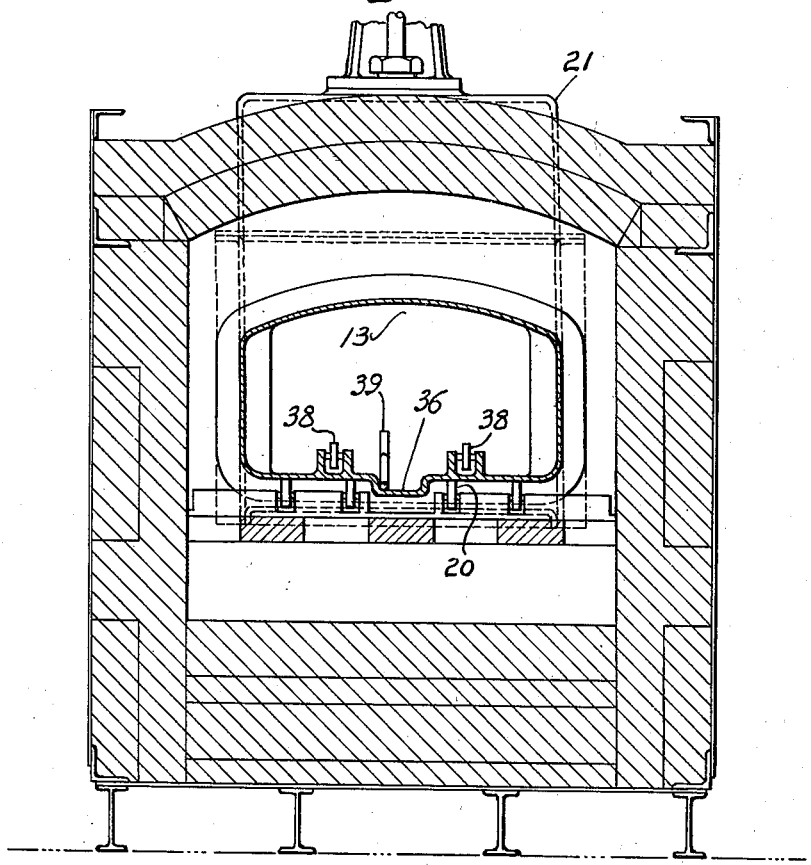
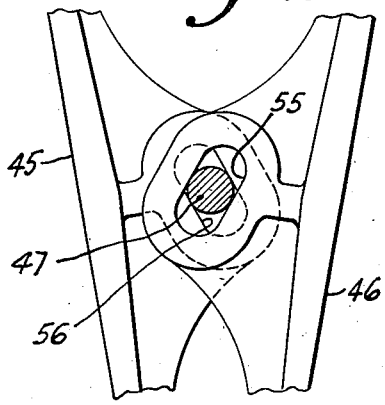
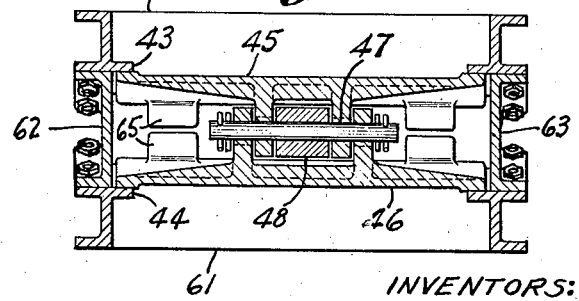
INVENTORS:
E. G. DeCORIOLIS
J. R. MOSER
BY Charles A. Lind
ATTORNEY.

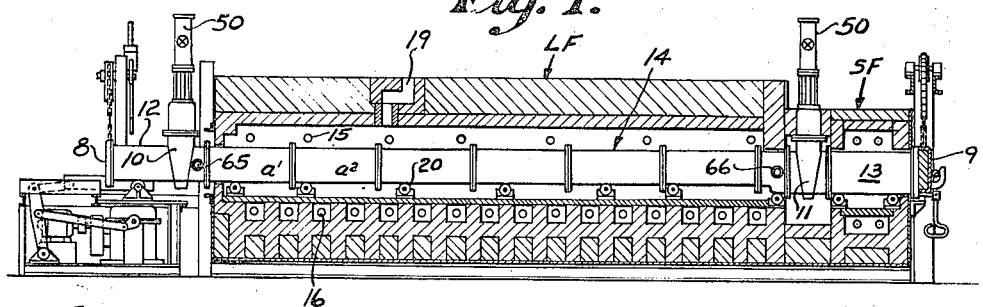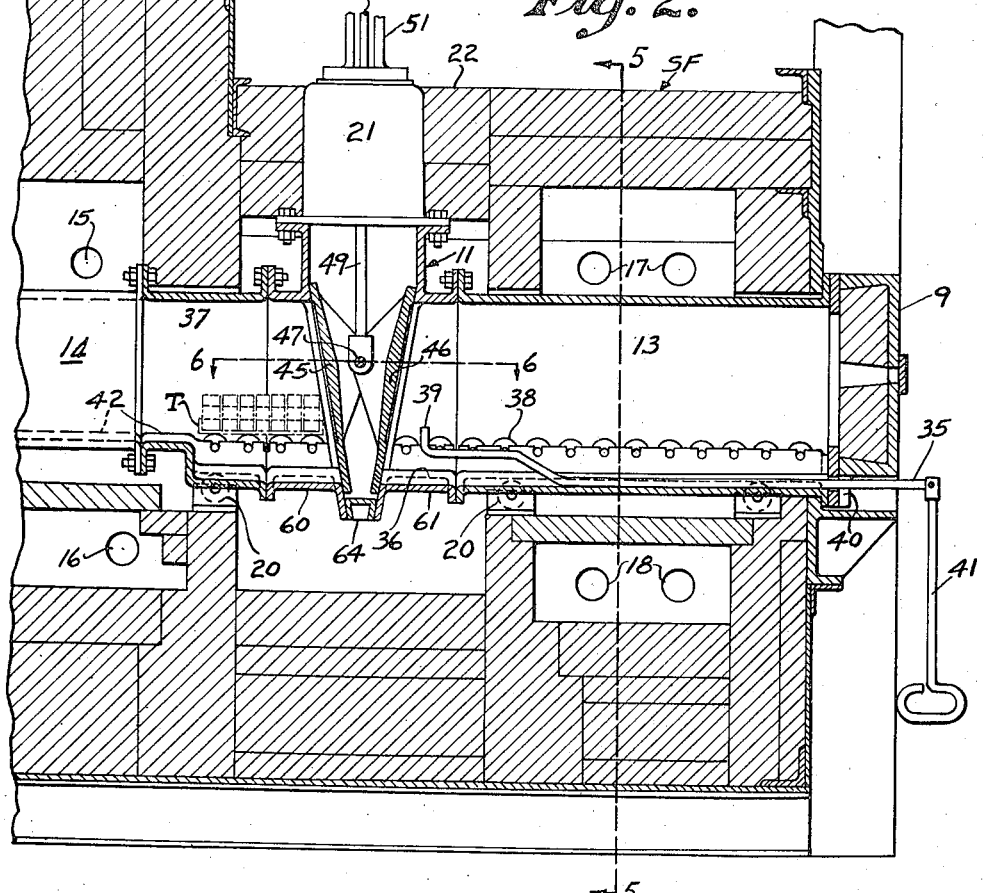

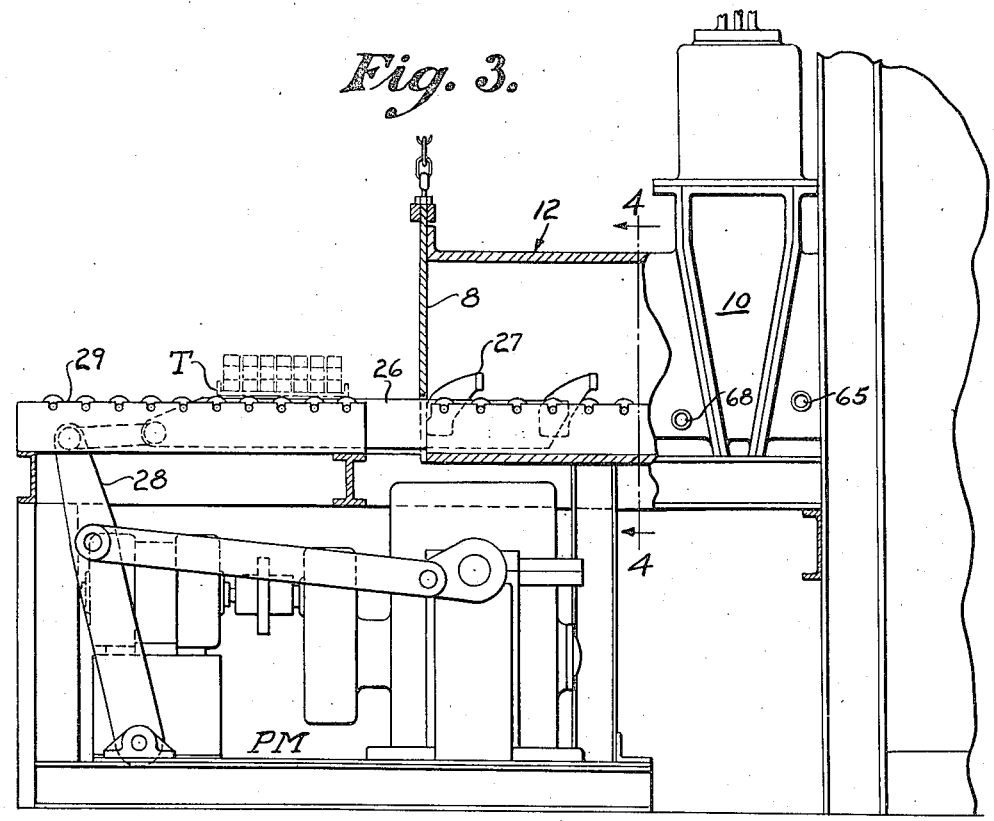
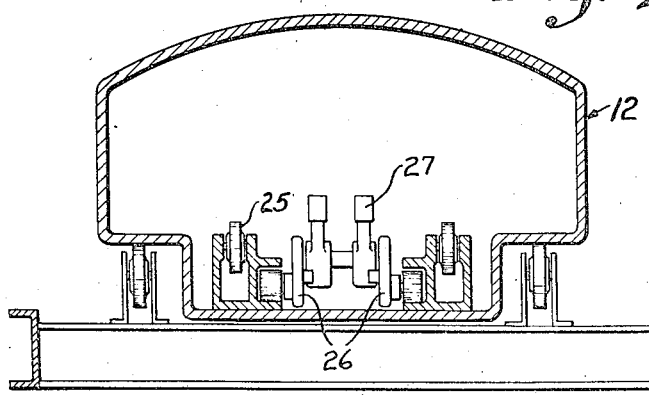

Patented Mar. 10, 1936

2,033,331

UNITED STATES PATENT OFFICE 2,033,331

HEAT TREATING FURNACE

Ernest G. de Coriolis and Jesse R. Moser, Toledo, Ohio, assignors to Surface Combustion Corporation, Toledo, Ohio, a corporation of New York Application September 28, 1933, Serial No. 691,289
Renewed January 11, 1936

6 Claims. (Cl. 263—6)

This invention relates to continuous heat treating furnaces embodying a closed work chamber or muffle for the heating of the work in a controlled atmosphere, and has for its object to provide a furnace which shall have special utility in connection with the continuous gas carburizing of iron and steel.

Referring to the accompanying drawings wherein the preferred form of the invention is shown,—

Fig. 1 is a longitudinal section of the improved furnace with parts in elevation, the view being on a reduced scale as compared with the other views;

Fig. 2 is a vertical longitudinal section of the discharge end of the furnace;

Fig. 3 is a side elevation of the charging end of the furnace with parts in section;

Fig. 4 is a cross section on line 4—4 of Fig. 3;

Fig. 5 is a cross section of the furnace on line 5—5 of Fig. 2;

Fig. 6 is a cross section of the closure construction on line 6—6 of Fig. 2, and Fig. 7 is an enlarged fragmentary view showing certain features of the hinge connection shown in Fig. 6.

The present invention embodies a relatively long metal tunnel provided at its opposite ends with vertically movable doors 8 and 9 of ordinary construction and provided inwardly of such doors with valves or closures 10 and 11 of special construction as will hereafter more fully appear. The tunnel is therefore divided into three chambers, namely, two end chambers 12 and 13 and a middle chamber or muffle 14.

The end chambers 12 and 13 are the charging and discharging chambers, respectively, and the muffle 14 is the main heat treating chamber wherein a controlled atmosphere is maintained during the heat treating operation. The muffle 14 is a relatively long affair and is contained within a heating furnace LF of corresponding length. The discharge chamber 13 is a relatively short affair and is contained within a heating furnace SF of corresponding length.

The furnaces may be fired in any suitable manner. However, in the present instance, the furnace LF is shown as fired by upper and lower rows of burners 15 and 16 and the furnace SF by upper and lower burners 17 and 18. The furnaces are independently controlled as regards temperature conditions. No special exhaust flue is necessary as regards the furnace SF but the furnace LF is preferably provided in its roof with an exhaust flue 19 shown as closer to the front valve 10 than the rear valve 11 since the burners on the opposite sides of the flue are independently controlled to give controlled temperature conditions in the corresponding portions of the muffle 14.

In both of the furnaces LF and SF the tunnel, susceptible as a unit to thermal expansion and contraction, is supported on rollers 20 to permit free longitudinal expansion and contraction. The tunnel is, however, anchored between the two furnaces by the upwardly extending housing 21 of the valve 11. Brick work 22 between the two furnaces anchors the housing for the valve 11 and hence the latter may be termed a "hot valve". The brick work is merely a filler wall between the two furnaces and may be readily removed in case the hot valve requires to be repaired or replaced. The hot valve and muffle are made of a suitable heat-resisting alloy. For constructional purposes, the muffle 14 is made up of relatively short sections bolted together.

In the present instance, the tunnel is designed for the passage of work trays T and means are provided for pushing the trays of work into the muffle 14 from the charging chamber 12. To this end there is provided in the chamber 12 two laterally spaced rows of tray supporting rollers 25, and between the rows is arranged a pushing device shown as comprising a slide 26 on which are mounted push dogs 27. The slide 26 is connected to a rocker arm 28 which is actuated by a power operated mechanism generally indicated at PM.

In front of the chamber 12 is a loading table 29 from which the trays are pushed by hand into the chamber preparatory to being pushed into the muffle 14 by the pushing mechanism. In due time enough trays will have been entered in the muffle 14 to form a row extending between the valves 10 and 11 and hence, before an additional tray can be entered, it will be necessary to remove the tray nearest the valve 11. This removal is accomplished by pulling such tray into the discharge chamber 13, the valve 10 being meanwhile closed.

The pulling out of a tray from the muffle 14 is preferably effected by means of a hooked rod 35 arranged to be moved lengthwise along a longitudinally extending channel 36 formed in the bottoms of the chamber 13, the valve 11 and in a short tunnel section 37 of the muffle 14. On either side of the channel are tray supporting rollers 38. Assuming the tray is in the position shown in Fig. 2 and the valve 11 open, the rod 35 will be so manipulated as to permit the hooked end 39 thereof to be passed beneath the tray for engagement with the remote edge thereof whereupon the tray may be pulled out as will be readily understood.

The rod 35 preferably enters the chamber 13 through an opening 40 beneath the door 9 and has a handle extension 41 which normally extends downwardly when not in use. By providing a special opening 40 for the pull rod, the door 9 may be left closed during the operation of pulling a tray from the muffle into the chamber 13. By thus leaving the door 9 closed, the inflow of air into the muffle 14 is reduced to a minimum during the pullout operation. At this point it may be well to mention that except for the section 37 adjacent the valve 11, the muffle will be provided with skid rails 42 instead of rollers for the trays.

As previously pointed out, the hot valve or closure 11 is made of a heat resisting alloy. The closure 10, being out in the open and, therefore, relatively cool, may be of a material which is less expensive than heat resisting alloy as, for example, ordinary steel, and may if desired be water cooled. Aside from these features, the two closures are essentially the same and the detailed description of these closures will, therefore, be confined to the hot valve 11.

The structure of the hot valve 11 comprises a pair of opposed flat valve seats 43 and 44 which extend upwardly in diverging relation; and arranged for cooperation with said seats are flat valve plates 45 and 46 hinged back to back and severally movable, each independently of the other, on a horizontally extending pintle 47 which is borne in a head 48 at the lower end of a piston rod 49 which extends from a power cylinder 50 (see Fig. 1). The piston rod of cylinder 50 thus constitutes the stem of the double valve. This cylinder is supported on a stool 51 which in turn is supported on the previously mentioned housing 21 which extends upwardly from and is in effect a part of the valve 11. When motive fluid is admitted to the cylinder 50, the piston rod is moved vertically either to raise the valve plates into the housing 21 or to lower them and thus close the valve. Since the valve seats diverge upwardly and the valve plates are hinged together, it will be readily appreciated that force exerted downwardly on the hinge pin 47 by the piston rod will wedge the plates to their seats.

The connection between the hinge pin 47 and the valve plates preferably embodies an upwardly diverging slot 55 formed in the back of one of the plates as the plate 46 and a similar slot 56 formed in the back of the other plate as plate 45 as is clearly shown in Fig. 7. This type of pin and slot connection insures a certain amount of desirable free movement between the pin and the plates and effectively assists in making a tight joint between the plates and their seats. Moreover, since the slots diverge in opposite directions, there results what may be termed a "V seat" for the pin with the result that downward movement of the pin tends to spread the plates apart and thus force them to their seats without necessarily moving the plates downwardly. By reason of this feature, the plates may be firmly held to their seats even though, due to expansion under heat, the distance between the two seats may increase, it being understood that, when the valve is closed, motive fluid in the cylinder 50 will be continually effective to force the pin downwardly in order to maintain the plates in engagement with their seats.

From the foregoing, it will be readily seen that in the absence of V seats for the pintle 47, it would be quite impossible to force the valve plates to their seats if, for example, the lower end of one or the other of the plates were to touch the bottom of the valve housing and hence, that a hinge connection which include the diverging slots 55 and 56 is of great practical importance in effectively sealing the ends of the muffle 14 against the entry of air.

It will further be remarked, on considering particularly Fig. 2, that the engagement between the pintle upon the valve stem and the slot in the valve plate is at a point above the center of gravity of the plate; and, in consequence, it is manifest that the upward traverse of the valve stem, causing the pintle to bear upon the oblique slots of the heated valve plates, is effective first to swing them inwardly at their upper ends, and so to crack the double valve at the upper edges of the plates first. Further traverse of the stem upwardly then raises the plates.

As shown in Figs. 2 and 6, the valve structure preferably includes two sections 60 and 61, between which, at the sides, are arranged wedge-shape spacers 62 and 63 and, at the bottom, a spacer 64, the sections and spacers being bolted together. Opposed lugs 65 on the back of the valve plates limit the free inward swinging of the plates at their lower ends, when the valve is raised.

From what has been said, the mode of operation of the furnace will be readily understood but may be briefly described as follows:

The tray containing the work to be carburized or otherwise heat treated is first placed upon the loading table 29 and pushed into the chamber 12 by hand. The door 8 is then closed. Before opening the valve 10, the chamber 12 is purged of air as by passing a current of flue gas from any suitable source through the chamber 12. The inlet for the flue gas is indicated at 68 in Fig. 3. After the chamber has been purged of air, the valve 10 is opened and the pusher 26 actuated to push the tray into the muffle 14 whereafter the valve 10 is closed. After a proper time interval, another tray of work will be inserted into the muffle 14 in the same manner and in due course there will be a row of trays extending between the valves 10 and 11 thus necessitating the removal of the loading tray from the muffle as will be readily understood.

The furnace SF is provided for maintaining the discharge chamber 13 at any desired temperature in order that the work withdrawn from the muffle 14 may be prepared for further heat treatment, as for example, for quenching.

The special atmosphere or carburizing gas enters the muffle 14 at 65 and leaves at 66. The carburizing process in connection with which the present invention has special utility is the one described in the patent to Cowan No. 1,932,032 issued Oct. 24, 1933. In that process, the work when first introduced into the muffle becomes covered with soot from the thermal decomposition of the hydrocarbon which is one of the constituents of the carburizing gas. In the present furnace, the first two sections $a^1$ and $a^2$ of the muffle are made of a chrome iron alloy devoid of nickel, such alloy being less active as a catalyst than steel in assisting in the thermal decomposition of a hydrocarbon, and hence in the present furnace the soot will tend to deposit on the work rather than on the walls of the first portion of the muffle. It may be mentioned that those burners 15 and 16 at the left of the flue 19 will be so controlled as to maintain in the first portion of the muffle a somewhat lower temperature than the next succeeding portion of the muffle in order to facilitate deposition of soot on the work in the first portion of the muffle.

What we claim is:

1. In a continuous heat-treating furnace of muffle type, a heating-furnace structure, a tunnel with metal walls and susceptible as a unit to thermal expansion and contraction extending within the heating-furnace structure, the said tunnel being provided at an intermediate point in its longitudinal extent with a transversely extending valve housing and with a valve seat adjacent such housing, and a valve movable between a position of closure upon said valve seat and a position of retraction within said housing, said housing being built into the heating furnace structure and by such building-in being anchored against longitudinal displacement, the said tunnel on both sides being free to respond to thermal expansion and contraction relatively to such anchorage.

2. In a continuous heat-treating furnace of muffle type, a heating-furnace structure, a tunnel with metal walls and susceptible as a unit to thermal expansion and contraction extending within and beyond the end of the heating-furnace structure, the said tunnel being provided at an intermediate point in its longitudinal extent with a transversely extending valve housing and with a valve seat adjacent such housing, and a valve movable between a position of closure upon said valve seat and a position of retraction within said housing, said housing being built into the heating furnace structure and by such building-in being anchored against longitudinal displacement, the said tunnel on both sides being free to respond to thermal expansion and contraction relatively to such anchorage, and the said tunnel being additionally equipped with a second valve in a portion of its extent beyond the end of the heating furnace structure.

3. A furnace comprising, in combination, a metal tunnel wherethrough objects are passed for heat-treatment, a heating structure through which said tunnel extends, said tunnel being provided with two transversely extending valve seats which face each other in diverging relation and the tunnel being subject to expansion and contraction between said seats, a valve comprising two plates one for each seat, means including a rod which extends into the tunnel between said plates for movably coupling them back to back, said tunnel having a lateral extension whereinto said valve may be moved by said rod for opening the passage between said seats, and means including said rod for continuously pushing said plates against their respective valve seats irrespective of the expansion and contraction of the tunnel between said seats after they have been moved into position against said seats.

4. A furnace comprising, in combination, a metal tunnel which is subject to expansion and contraction and wherethrough objects are passed for heat-treatment, a heating structure through which the tunnel extends, said tunnel being provided with two transversely extending valve seats which face each other in spaced relation, a valve comprising two plates one for each seat, said tunnel having a lateral extension whereinto said valve may be moved for opening the passage between said seats, a projection extending from the back side of each plate, a pin extending through said projections for hingedly connecting the plates, the several projections having slots which mutually cooperate to form a V-seat for the pin, a rod extending into said tunnel and coupled to said pin for moving said valve into said extension, and means including said rod for continuously pushing said pin against the V-seat after the said plates have been moved into position against their respective valve seats whereby to continuously push the plates against their respective seats irrespective of expansion and contraction of the tunnel between said seats.

5. A continuous gas carburizing furnace comprising, in combination, a metal muffle wherethrough objects may be passed for treatment in a controlled atmosphere, a heating structure through which said muffle extends, means including two transversely extending oppositely-facing valve seats which interrupt the longitudinal continuity of the muffle and the muffle being subject to expansion and contraction between said seats, a valve comprising two plates, one for each seat for sealing off the passage between said seats, and means continuously effective after said plates are disposed against their respective valve seats for continuously pressing said plates against their valve seats irrespective of expansion and contraction of the muffle between said seats.

6. A continuous carburizing furnace comprising a metal tunnel wherethrough objects are passed for heat-treatment, said tunnel being provided with two transversely extending oppositely-facing divergent valve seats and the tunnel between said seats being subject to expansion and contraction, a valve comprising two relatively movable plates one for each seat, said tunnel having a lateral extension whereinto said valve may be moved for opening the passage between said seats, a projection extending from the back side of each plate, a pin extending through said projections for hingedly connecting the plates, the several projections having slots which mutually cooperate to form a V-seat for the pin, the angle included by the V being greater than the angle included by the said valve seats, and power operated means extending into said tunnel through said extension and coupled to said pin for pushing said pin toward the narrower end of the V-seat after the said plates have been moved into position against their respective valve seats whereby to exert pressure between the plates for pushing them against their respective seats irrespective of their relative expansion and contraction.

ERNEST G. DE CORIOLIS.
JESSE R. MOSER.